(12) United States Patent
Crosnier et al.

(10) Patent No.: US 7,985,018 B2
(45) Date of Patent: Jul. 26, 2011

(54) INSTALLATION AND A METHOD FOR SCRAPING A BED-PLATE OF A COMPOUNDER

(75) Inventors: Gérard Crosnier, Ceyrat (FR); Arnaud Letocart, Combronde (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 108 days.

(21) Appl. No.: 12/507,383

(22) Filed: Jul. 22, 2009

(65) Prior Publication Data
US 2010/0019404 A1 Jan. 28, 2010

(30) Foreign Application Priority Data
Jul. 24, 2008 (FR) ...................................... 08 55073

(51) Int. Cl.
*B28C 7/16* (2006.01)
(52) U.S. Cl. ............. 366/77; 366/309; 425/225; 264/39
(58) Field of Classification Search .................. 425/161, 425/225; 264/39; 366/77, 192, 309, 311
See application file for complete search history.

(56) References Cited

U.S. PATENT DOCUMENTS

| | | | | |
|---|---|---|---|---|
| 2,615,689 | A | * | 10/1952 | Schnuck et al. ................ 366/77 |
| 2,939,616 | A | * | 6/1960 | Whittum et al. .............. 222/512 |
| 3,468,518 | A | | 9/1969 | Koch |
| 3,695,587 | A | * | 10/1972 | De Marco ....................... 366/77 |
| 4,234,259 | A | | 11/1980 | Wiedmann et al. |
| 5,492,403 | A | * | 2/1996 | Metcalf et al. .................. 366/77 |
| 5,593,226 | A | * | 1/1997 | Peter .............................. 366/69 |

* cited by examiner

*Primary Examiner* — Joseph S Del Sole
*Assistant Examiner* — James Sanders
(74) *Attorney, Agent, or Firm* — Cohen Pontani Lieberman & Pavane LLP

(57) ABSTRACT

An installation for fabricating a mass of rubber comprises a vessel for compounding the mass of rubber. The vessel includes an outlet opening for the mass of rubber; a gate for closing the opening and movable between a position in which the opening is closed, and a position in which the opening is disengaged; scraper means for scraping the rubber adhering to a so-called internal surface of the gate, this device including a movable scraper member comprising an edge designed to scrape the rubber adhering to the internal surface; and synchronization means for synchronizing the movements of the gate and of the scraper member.

14 Claims, 5 Drawing Sheets

INSTALLATION AND A METHOD FOR SCRAPING A BED-PLATE OF A COMPOUNDER

FIELD OF THE INVENTION

The present invention relates to an installation for fabricating a mass of rubber.

The mass of rubber is intended more particularly for use in fabricating tires.

BACKGROUND OF THE INVENTION

In the state of the art, an installation is already known for fabricating a mass of rubber, which installation comprises a vessel for compounding the mass of rubber.

The vessel includes a vessel-loading opening, an outlet opening for the mass of rubber, and a gate for closing the outlet opening. The gate is pivotable about gate axis between a position in which it closes the outlet opening and a position in which it disengages said opening.

The vessel also has two compounding rotors that are rotatable about axes that are substantially parallel to the gate axis.

The gate presents a so-called internal surface that is generated by generator lines extending substantially parallel to the axes of the rotors. As a general rule, the gate axis is also parallel to the axis of the rotors. During compounding, the rubber is homogenized, in particular under the effect of the stresses exerted on the rubber as it flows between the rotors and the internal surface of the gate.

Nevertheless, with certain rubber formulations, the rubber adheres to the internal surface of the gate in such a manner that, when the gate is open, a residue of rubber adheres to the internal surface, and that, when the gate is closed, this residue of rubber is returned into the vessel.

Unfortunately, the formulation of the rubber that is subsequently compounded in the vessel need not necessarily be the same as that previously compounded in the vessel, so returning a residue of rubber into the vessel can modify the formulation of the rubber that is to be compounded, which it is desirable to avoid in order to have control over the quality of the formulation. In addition, the residue can also prevent the gate from closing correctly, and that also ought to be avoided.

Provision is thus generally made, when the gate of the vessel is open, for an operator to clean the internal surface of the gate manually with the help of a scraper. This manual cleaning is time-consuming and requires the gate to be kept in its open position throughout the time required for cleaning it, thereby disturbing rubber production rates. Furthermore, the presence of an operator close to the vessel requires safety measures to be taken that consist in temporarily deactivating at least a portion of the installation, thereby further disturbing production rates.

OBJECT AND SUMMARY OF THE INVENTION

An object of the invention is to provide an installation that makes it possible to avoid the cleaning of the internal surface of the gate that gives rise to a disturbance in rubber production rates.

To this end, one aspect of the invention is directed to an installation for fabricating a mass of rubber, the installation being of the type comprising a vessel for compounding the mass of rubber and including:

an outlet opening for the mass of rubber; and
a gate for closing the opening and movable between:
  a position in which the opening is closed; and
  a position in which the opening is disengaged;
wherein the installation further includes:
  scraper means for scraping the rubber adhering to a so-called internal surface of the gate, this device including a movable scraper member comprising an edge designed to scrape the rubber adhering to the internal surface; and
  synchronization means for synchronizing the movements of the gate and of the scraper member.

The mentioned installation enables the gate to be cleaned without disturbing the operation of the installation. Since the movement of the scraper member is synchronized with the movement of the gate, the scraper member can scrape off the rubber adhering to the internal surface while the gate is opening without any human intervention being needed. In addition, the internal surface is scraped in time that is non-critical, thus making it possible to avoid pointlessly keeping the gate in the open position.

According to an optional characteristic of the installation, the gate is movable in pivoting about an axis of the gate, and the scraper member is hinged to pivot about an axis of the scraper device that is substantially parallel to the axis of the gate.

Preferably, the internal surface is generated by generator lines that are substantially parallel to the axes, and the path of the internal surface intersects the path of the scraper edge in a plane that is substantially perpendicular to the axes.

Thus, it is possible to scrape the entire internal surface of the gate. The edge of the scraper member scrapes the internal surface that has followed a path that intersects the path of the scraper edge. Thus, regardless of the shape of the internal surface, providing the path of the entire internal surface between its closed and disengaged positions intersects the path of the scraper edge, the entire internal surface can be scraped.

According to other optional characteristics of the installation of the invention:

The scraper device includes means for moving the scraper member and urging it against the rubber for scraping, said means including in particular a hydraulic cylinder.

The installation includes means for moving the gate, and the synchronization means comprise a control unit interconnecting the means for moving the scraper member and the means for moving the gate. The control unit makes it possible in particular to control the travel speed of the scraper member relative to the position of the gate and/or the position of the scraper member and/or the path of the internal surface.

Optionally, the scraper device includes a pair of arms supporting the scraper member with the scraper member extending between the arms, the arms being mounted to pivot about the axis of the scraper device and defining a disengagement space into which the gate is designed to be moved at least over a fraction of its path between its closed position and its disengaged position.

In an embodiment of the invention, the scraper member comprises a blade designed to come into contact with the internal surface of the gate.

Preferably, the blade is hinge-mounted on the arms about a swivel axis for swiveling the blade relative to the internal surface, the swivel axis being substantially parallel to the axes of the gate and of the scraper device.

The angle of incidence of the blade relative to the internal surface may thus be modified as a function of the portion of the internal surface against which the blade is in contact. Preferably, the blade can be swiveled in such a manner as to present an angle of incidence that is constant relative to the internal surface. The angle of incidence is defined by the angle between the blade and the normal to the internal surface at the point of contact between the blade and the surface.

Optionally, the scraper device includes means for automatically swiveling the blade about the swivel axis, preferably means for moving the blade about the swivel axis, such as a bar, or indeed gravity, e.g. off-center weights secured to a shaft, and serving to keep the blade pressed against the internal surface of the gate.

In another example, the automatic swivel means are connected to the synchronization means, thus enabling them to adjust the angle of incidence of the blade as a function of the position of the member and/or the position of the gate and/or the path of the internal surface.

In a variant, the blade is stationary relative to the arms.

In this variant, the angle of incidence of the blade relative to the internal surface varies.

In another embodiment of the invention, the scraper member comprises a scraper wire designed to come into contact with the internal surface of the gate.

Another aspect of the invention is directed to a method of fabricating a mass of rubber, wherein a mass of rubber is fabricated in an installation as defined above, and wherein the movements of the scraper member and the gate are synchronized with each other.

BRIEF DESCRIPTION OF THE DRAWINGS

The invention can be better understood on reading the following description given purely by way of non-limiting example and made with reference to the drawings, in which.

DETAILED DESCRIPTION OF THE DRAWINGS

Figure 1:
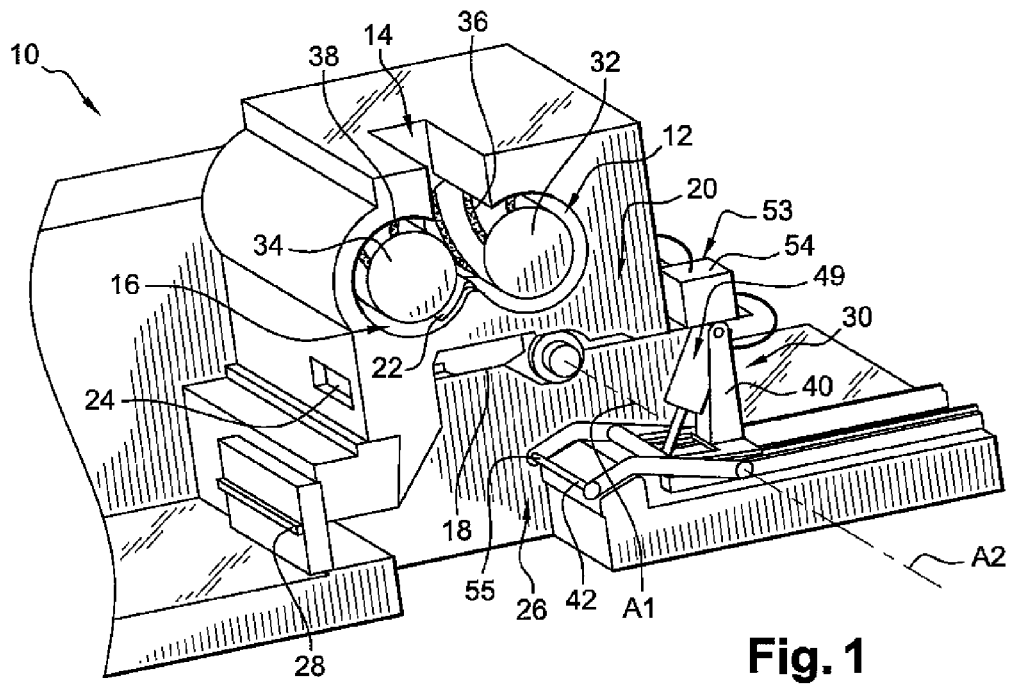
FIG. 1 is a perspective view of an installation in a first embodiment of the invention.

FIGS. 1 to 8 show an installation in a first embodiment, given overall reference 10.

The installation 10 comprises a vessel 12 for compounding a mass of rubber. The vessel 12 has a vessel-loading opening 14, a rubber mass outlet opening 16, and a gate 18 for closing the opening 16. The gate 18 is movable in pivoting about an axis A1 between a position closing the opening 16, as shown in FIGS. 1 to 4, and a position disengaged from the opening, shown in FIGS. 5 to 8. For this purpose, the installation 10 includes motor means 20 for moving the gate 18, specifically an electric motor. Furthermore, the gate 18 includes a so-called internal surface 22 for defining the vessel in the closed position. The internal surface 22 is generated by generator lines that extend substantially parallel to the axis A1.

In addition, the installation 10 includes locking means 24 for locking the gate 18 in the closed position of the gate 18.

The installation 10 also includes a drop space 26 situated beneath the vessel 12 and enabling the mass of rubber to drop from the vessel 12 when the gate 18 is in the disengaged position.

In addition, the installation 10 includes a hatch 28 giving access to the space 26.

The installation 10 also includes a scraper device 30 for scraping off rubber that adheres to the internal surface 22.

The vessel 12 has two rotary compounding rotors 32 and 34 movable in rotation about axes R1 and R2 that are substantially parallel to the axis A1. Each rotor 32, 34 has respective compounding fins 36 and 38.

The scraper device 30 comprises a stand 40 and a scraper member 42 hinged to pivot about an axis A2 of the device 30, substantially parallel to the axis A1.

Figure 3:
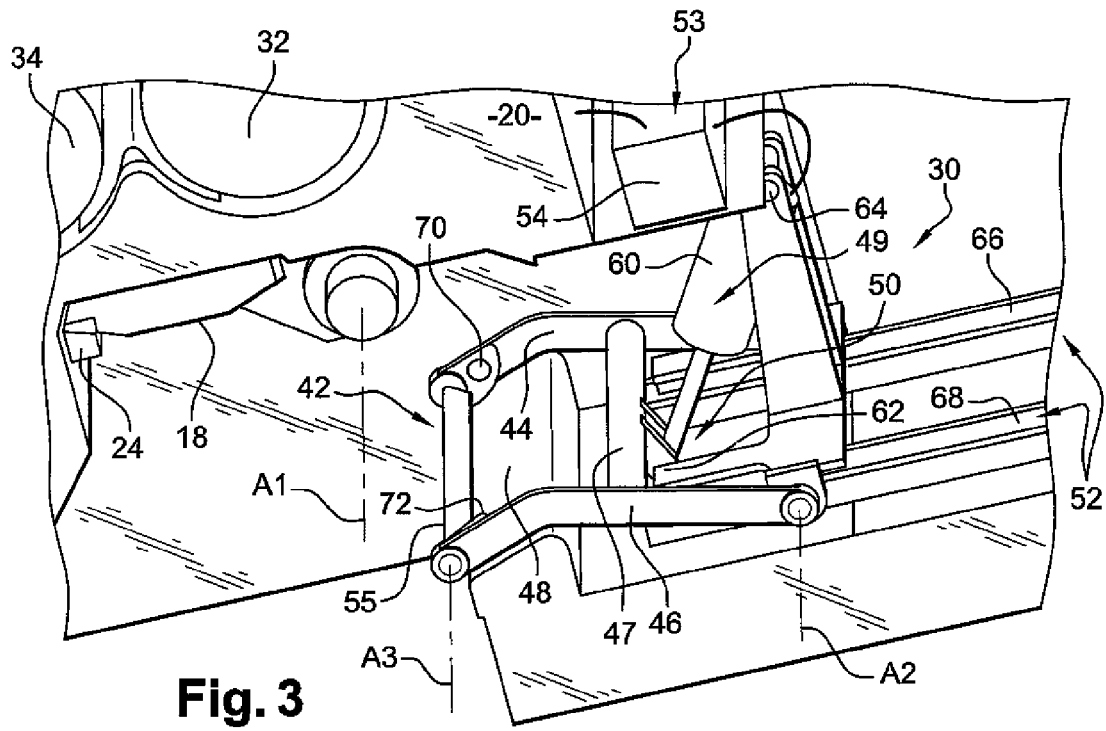
FIG. 3 is an enlarged view of a scraper device of the FIG. 1 installation.
Figure 4:
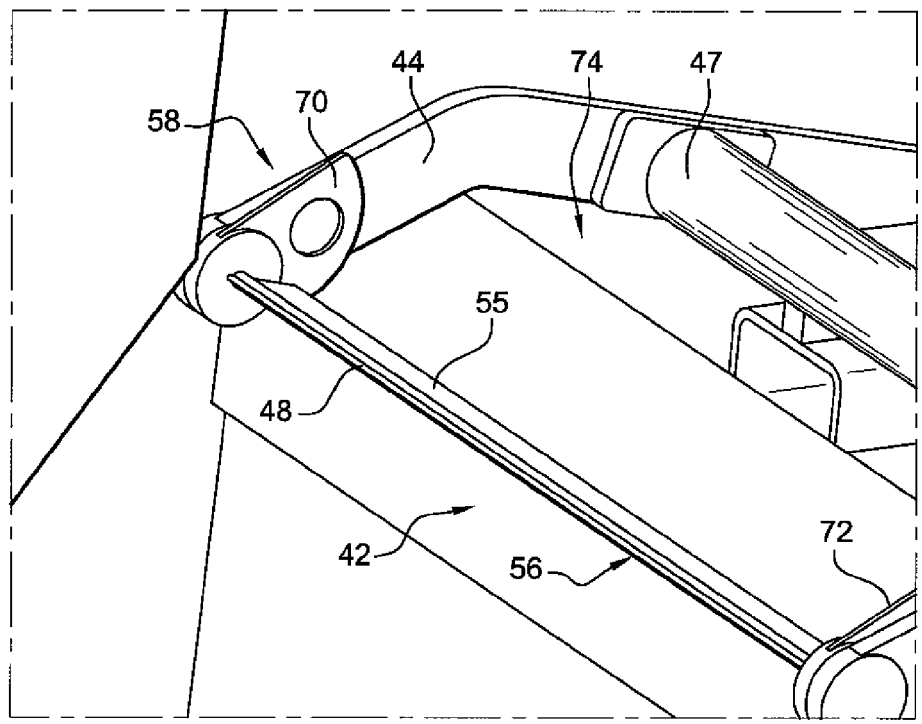
FIG. 4 is an enlarged view of a blade of the FIG. 3 device.

With reference to FIG. 3, the device 30 also includes a pair of arms 44, 46 for supporting the scraper member 42, with the member 42 extending between the arms. The pair of arms 44 and 46 is mounted to pivot relative to the stand 40 about the axis A2. The device also has a cross-member 47 interconnecting the two arms 44 and 46.

Furthermore, the device 30 includes a rest 48 on which the arms 44, 46 bear.

In addition, the device 30 includes moving or actuator means 49 for moving the scraper member 42 and urging means 50 for urging the scraper member 34 against the rubber that is to be scraped. The device 30 also has adjustment means 52 for adjusting the position of the stand 40 relative to the gate 18.

The installation 10 also has synchronization means 53 for synchronizing the movements of the gate 18 with the movements of the scraper member 42.

Figure 2:
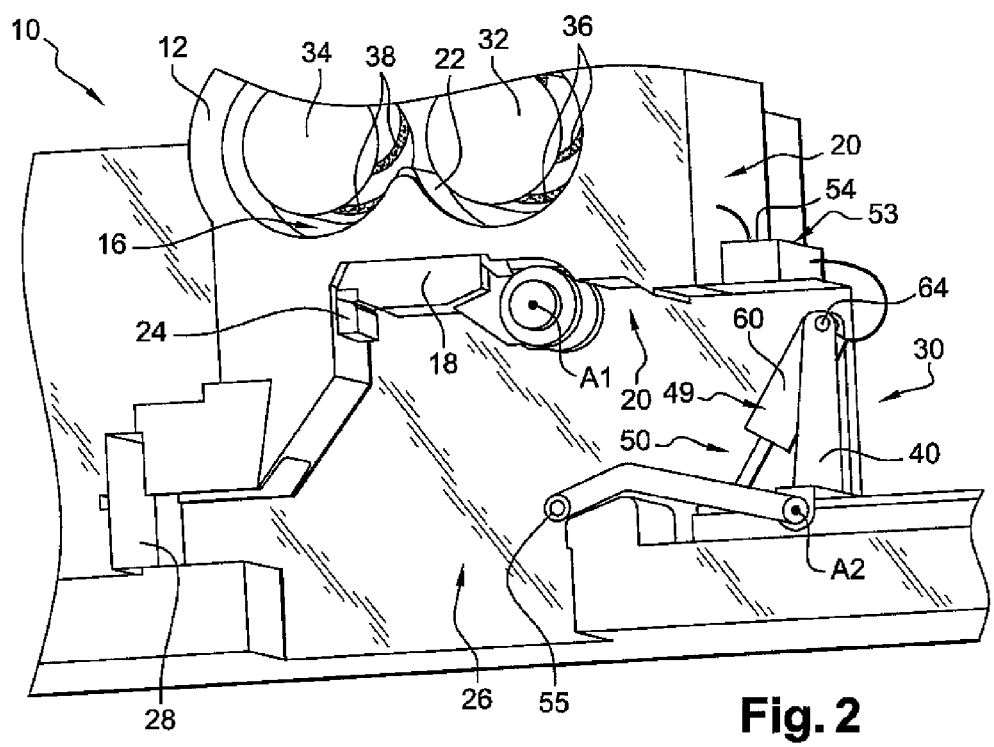
FIG. 2 is another perspective view of the FIG. 1 installation.

As shown in FIGS. 1 and 2, the synchronization means 53 comprise a control unit 54 connecting the moving or actuator means 49 for moving the member 42 and the motor means 20 for moving the gate 18.

As shown in FIGS. 1 to 8, the member 42 comprises a blade 55 for coming into contact with the internal surface 22 and presenting an edge 56 for scraping the rubber adhering to the internal surface 22.

The internal surface 22 presents two concave portions 22A and 223 interconnected by a convex portion 22C. Each portion 22A, 22B has a respective end edge 57A, 57B defining the surface 22.

The edge 56 is substantially rectilinear and parallel to the axes A1 and A2. In this first embodiment, the blade is hinge-mounted to the arms 44 and 46 about a swivel axis A3 for swiveling the blade 55 relative to the internal surface 22. The axis A3 is substantially parallel to the axes A1 and A2. In a variant, the blade 55 is stationary relative to the arms 44 and 46.

In addition, the device 30 includes swivel means 58 for automatically angularly swiveling the blade 55 about the swivel axis A3.

As shown in FIG. 3, the actuator means 49 and the urging means 50 comprise a hydraulic cylinder 60 connected to the cross-member 47 that is secured to the arms 44 and 46 and to the stand 40 via respective pivot connections 62 and 64 about axes that are substantially parallel to the axis A2.

The adjustment means 52 comprise two rails 66, 68 on which the stand 40 is mounted to move in translation relative to the gate 18.

The swivel means 58 for swiveling the blade 55 are of the type that act by gravity. Specifically, the means 58 comprise two off-axis weights 70 and 72 secured to the blade 55.

With reference to FIGS. 4 to 8, the pair of arms 44 and 46 defines a disengagement space 74 within which the gate 18 is designed to be moved at least over a fraction of its path between its closed position and its disengaged position.

The installation 10 enables a mass of rubber to be fabricated in application of a fabrication method for which the main steps associated with the invention are described below.

Initially, the vessel 12 is filled via the opening 14 with ingredients that are to form the mass of rubber. Thereafter, the ingredients are compounded in the vessel 12 by means of the rotors 32 and 34.

At the end of the rubber compounding step, the rotors 32 and 34 are stopped. The vessel 12 is then opened via its opening 16 by moving the gate 18 from its closed position to its disengaged position.

During this movement, the mass of rubber present in the vessel 12 drops into the drop space 26.

In addition, during this movement, the movements of the scraper member 42 are synchronized with the movements of the gate 18.

During the movement, in a plane that is substantially perpendicular to the axes A1 and A2, the path of the internal surface 22 intersects the path of the scraper edge 56. Thus, the entire internal surface 22 is scraped by the edge 56.

Figure 5:
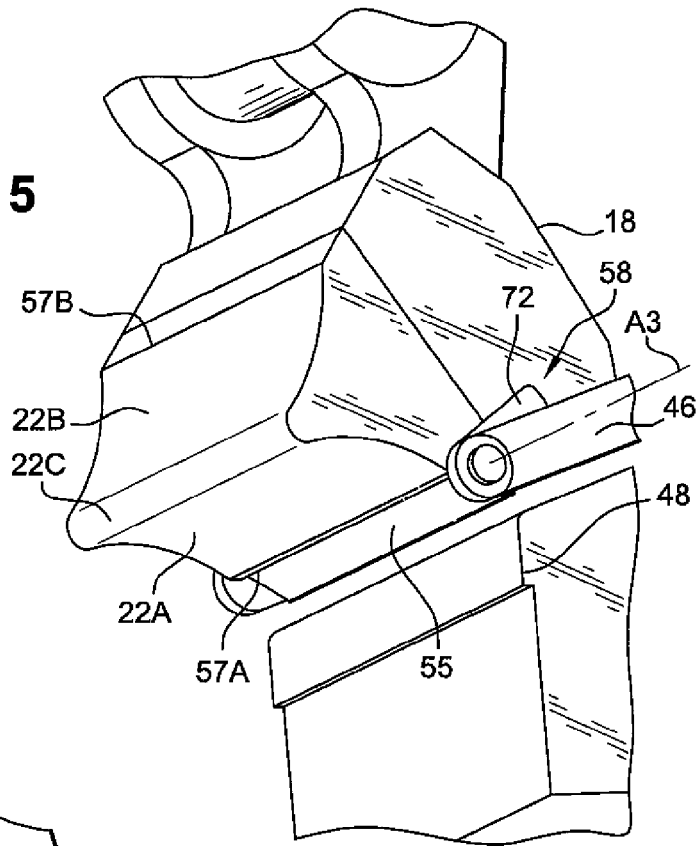
FIGS. 5 to 8 are perspective views of the blade in contact with a gate of the FIG. 1 installation, in successive positions.
Figure 6:
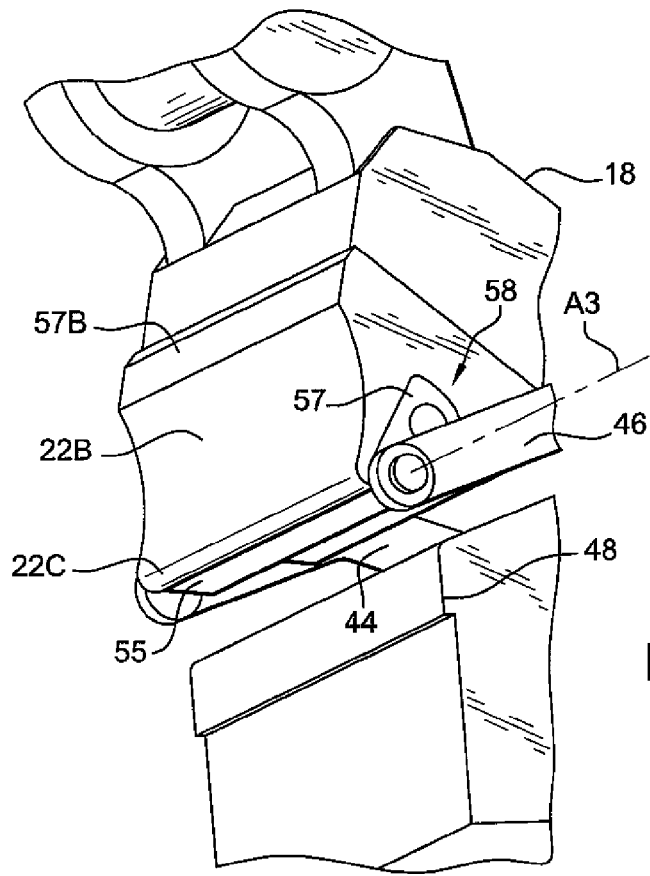
Figure 7:
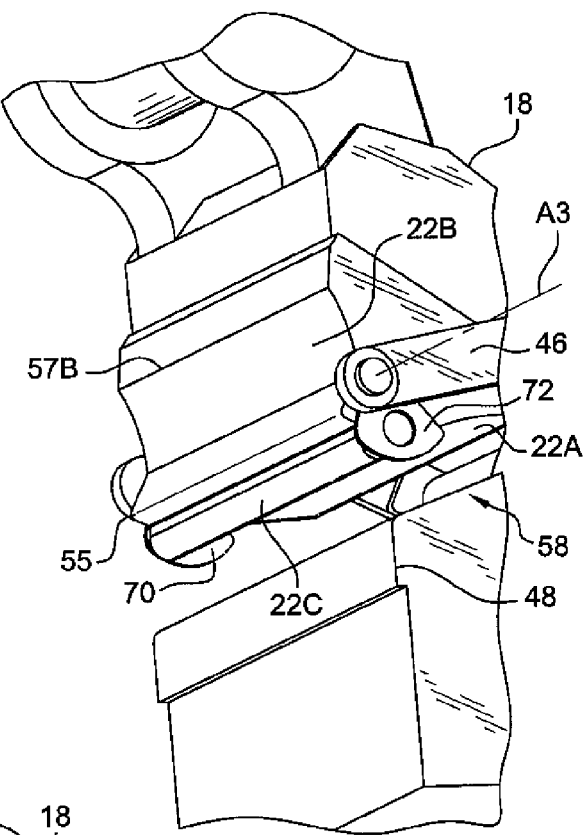

As shown in FIG. 5, the path of the member 42 presents a so-called engagement position in which the edge 56 comes into contact with the end edge 57A of the portion 22A of the internal surface 22. To reach the engagement position, the member 42 is moved from a so-called rest position in which the arms 44 and 46 bear against the rest 47, until the edge 56 comes into contact with the edge 57A.

Figure 8:
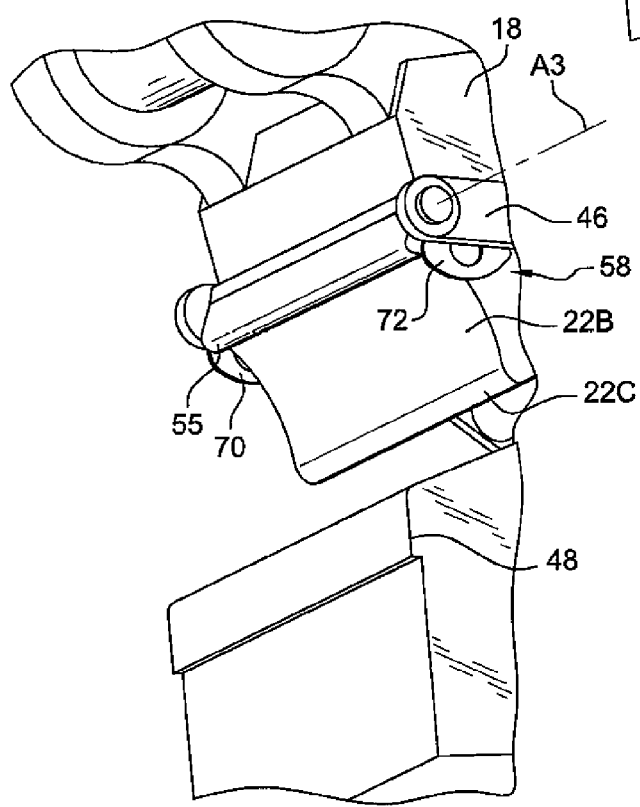

Thereafter, the gate 18 and the member 42 are moved. The edge 56 scrapes the portion 22A (FIG. 5) and then the portion 22C (FIG. 6), and finally the surface 22B until the edge 56 reaches the end edge 57B (FIG. 8). The member 42 is then in an end-of-scraping position.

The member 42 is then moved from its end-of-scraping position to the rest position.

Figure 9:
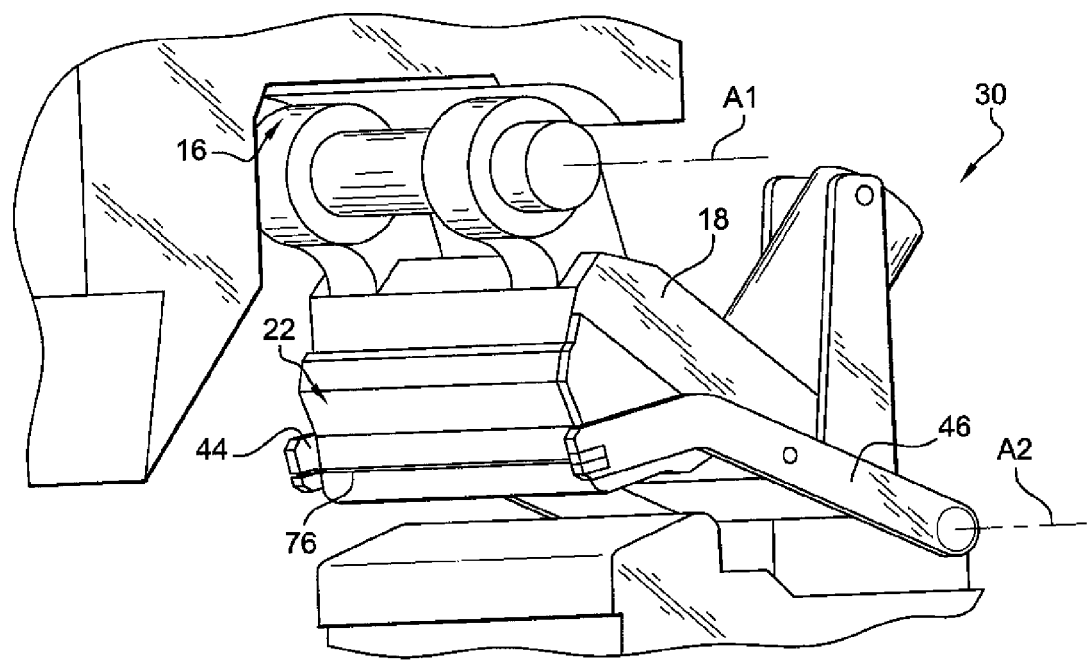
FIG. 9 is a perspective view of a scraper device of an installation in a second embodiment of the invention.

FIG. 9 shows an installation 10 in a second embodiment of the invention. In this embodiment, elements analogous to those of the first embodiment are designated by references that are identical. The omission of numerical references for elements in FIG. 9 does not mean that those elements are absent from the second embodiment.

Unlike the first embodiment, the scraper member 42 comprises a scraper wire 76 for scraping the internal surface 22. The wire presents a section that is substantially cylindrical and it extends substantially parallel to the axes A1 and A2.

The invention is not limited to the two embodiments described above.

The paths of the internal surface and of the scraper member could be other than mere pivoting about a respective axis. For example, the gate could present a path that results from combining the following in succession or simultaneously:
- a plurality of pivoting movements about distinct pivot axes; or
- movement in translation followed by pivoting movement; or
- a plurality of movements, in translation.

What is claimed is:

1. An installation for fabricating a mass of rubber, the installation being of the type comprising a vessel for compounding the mass of rubber and including:
    an outlet opening for the mass of rubber;
    a gate for closing the opening and movable between:
        a position in which the opening is closed, and
        a position in which the opening is disengaged;
    scraper means for scraping the rubber adhering to a so-called internal surface of the gate, this device including a movable scraper member comprising an edge designed to scrape the rubber adhering to the internal surface; and
    synchronization means for synchronizing the movements of the gate and of the scraper member.

2. The installation according to claim 1, wherein the gate is movable in pivoting about an axis of the gate, and the scraper member is hinged to pivot about an axis of the scraper device that is substantially parallel to the axis of the gate.

3. The installation according to claim 2, wherein the internal surface is generated by generator lines that are substantially parallel to the axes, and the path of the internal surface intersects the path of the scraper edge in a plane that is substantially perpendicular to the axes.

4. The installation according to claim 1, wherein the scraper device includes means for moving the scraper member and urging it against the rubber for scraping, said means including a hydraulic cylinder.

5. The installation according to claim 4, wherein the installation includes means for moving the gate, and the synchronization means comprise a control unit interconnecting the means for moving the scraper member and the means for moving the gate.

6. The installation according to claim 1, wherein the scraper device includes a pair of arms supporting the scraper member with the scraper member extending between the arms, the arms being mounted to pivot about the axis of the scraper device and defining a disengagement space into which the gate is designed to be moved at least over a fraction of its path between its closed position and its disengaged position.

7. The installation according to claim 1, wherein the scraper member comprises a blade designed to come into contact with the internal surface of the gate.

8. The installation according to claim 7, wherein the blade is hinge-mounted on the arms about a swivel axis for swiveling the blade relative to the internal surface, the swivel axis being substantially parallel to the axes of the gate and of the scraper device.

9. The installation according to claim 8, wherein the scraper device includes means for automatically swiveling the blade angularly about the swivel axis.

10. The installation according to claim 7, wherein the blade is stationary relative to the arms.

11. The installation according to claim 1, wherein the scraper member comprises a scraper wire designed to come into contact with the internal surface of the gate.

12. The installation according to claim 9, wherein the scraper device includes means for moving the blade about the swivel axis by gravity.

13. The installation according to claim 12, wherein the means for moving the blade about the swivel axis by gravity comprises off-axis weights.

14. A method of fabricating a mass of rubber, wherein a mass of rubber is fabricated in an installation according to claim 1, and wherein the movements of the scraper member and the gate are synchronized with each other.

* * * * *